May 2, 1944.  H. B. MARIS  2,347,703
WIND CALCULATOR
Filed March 31, 1943  2 Sheets-Sheet 1

INVENTOR.
Harry B. Maris
BY
HIS ATTORNEY

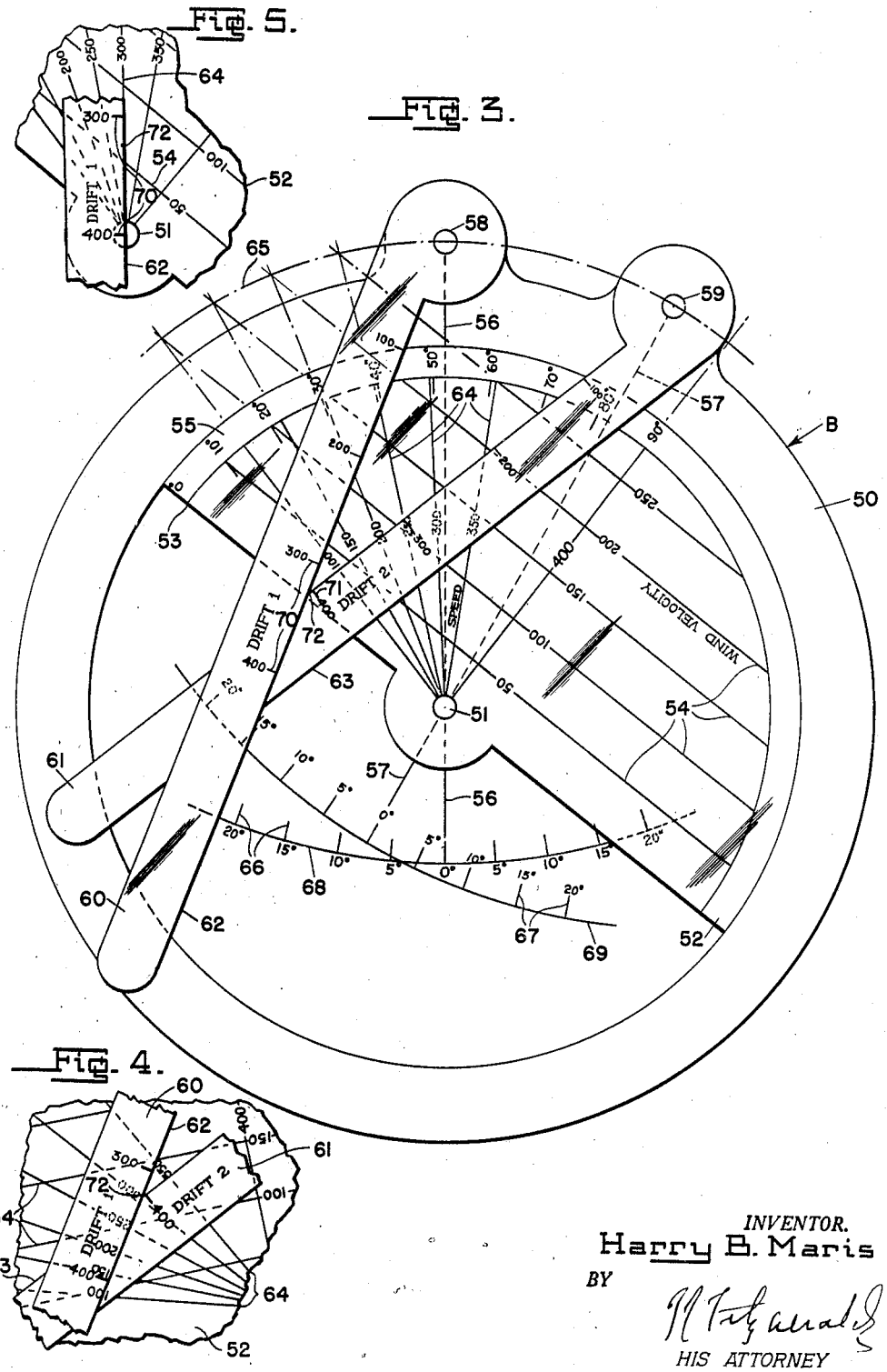

Patented May 2, 1944

2,347,703

UNITED STATES PATENT OFFICE 2,347,703

WIND CALCULATOR

Harry B. Maris, Riverdale, Md.

Application March 31, 1943, Serial No. 481,213

7 Claims. (Cl. 33—76)

(Granted under the act of March 3, 1883, as
amended April 30, 1928; 370 O. G. 757)

The invention relates to improvements in wind calculators for use by aircraft flight personnel, such as pilots or navigators.

An important object of the invention is to provide means for calculating the value of wind velocity and ground speed relative to air speed, and direction of wind relative to heading when the air speed of an aircraft and its angles of drift relative to alternate courses of flight are known.

Other objects and advantages of the invention will become apparent during the course of the following detailed description, taken in connection with the accompanying drawings, forming a part of this specification, and in which drawings, Figure 1 is a top plan view of a preferred form of my calculator.

Figure 3 is a top plan view of a modified form of the calculator, with the parts thereof set to calculate wind direction.

Figure 4 is a fragmentary top plan view of the calculator shown in Figure 3, with the parts set to calculate wind velocity.

Figure 5 is a fragmentary top plan view similar to Figure 4, but showing a different relationship of parts.

In the drawings, where similar reference characters denote corresponding parts throughout the several views, the letters A and B generally designate the preferred and one modified forms of the calculator.

Figure 1:
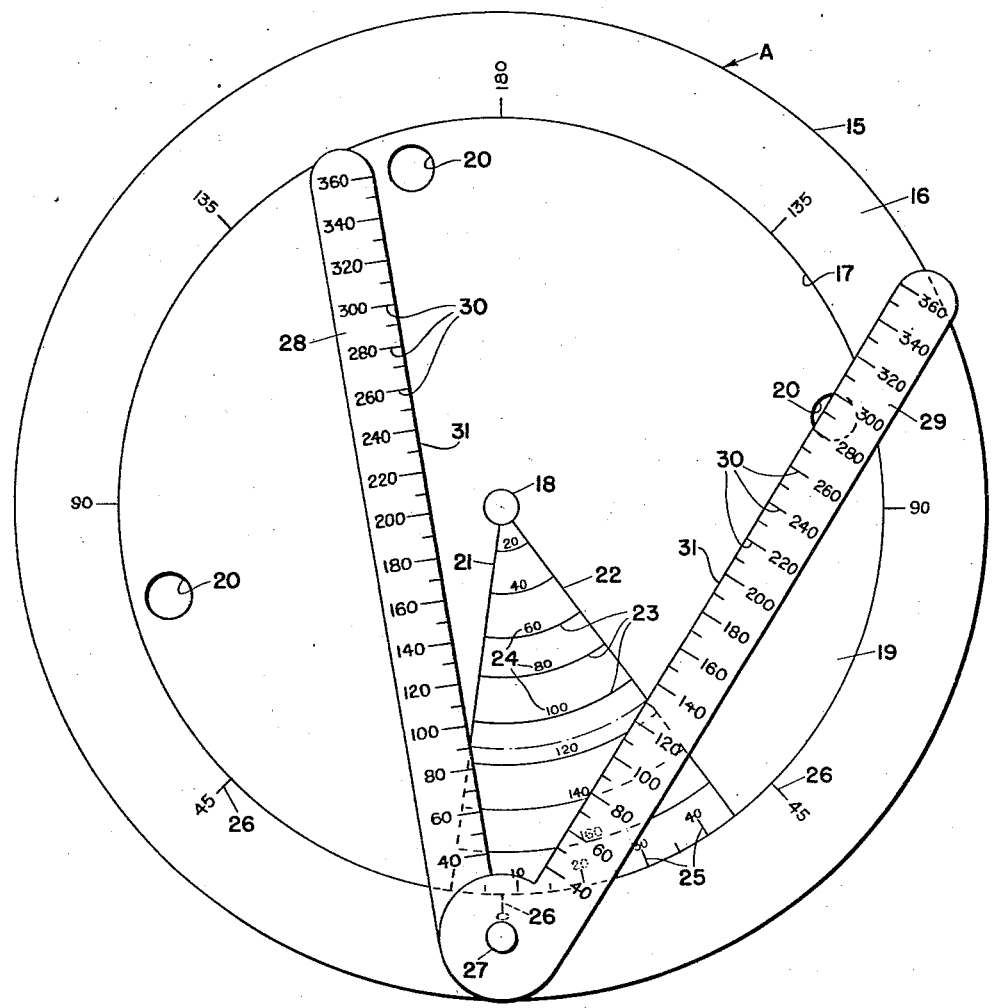
Figure 2:
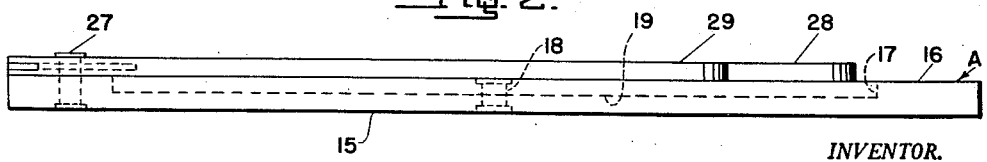
Figure 2 is a view in side elevation of the calculator.

Referring first to the form A shown in Figures 1 and 2 of the drawings, this calculator includes a preferably circular supporting plate 15 reduced in thickness inwardly of its annular marginal edge portion 16 to provide a circular depression 17. Mounted for rotation in the depression, as by a pivot 18, is a disc 19, which may be provided with finger-receiving openings 20 to facilitate turning thereof. In the example shown, this disc 19 is provided with lines 21, 22 defining a 45° angle corresponding to the angle between alternate courses of flight.

Extending between the lines 21, 22 are evenly spaced arcuate lines 23 concentric to the axis of the pivot 18 and provided with numerical indicia 24. Extending along the margin of the disc between the lines 21, 22 is a scale 25 of angles for indicating, in conjunction with angularly spaced indicia 26 on the supporting plate 15, the direction of the wind relative to alternate courses of flight. Secured to the supporting plate 15 at a distance from the axis of the pivot 18, as by a pivot 27, are arms 28, 29 provided with ground speed scales 30 extending along the inner sides of the arms. These scales 30 subdivide the straight-edges 31 at the inner sides of the arms into sections of a length equal to the spacing between the arcuate lines 23 representing wind velocity. The indicia 24 represents the wind velocity relative to the ground when the distance between pivots 18 and 27 represents air speed. From an inspection of Figure 1 of the drawings, it will be seen that the straight-edges 31, if extended would intersect in the axis of the pivot 27.

In the operation of the wind calculator A, the arm 28 is swung about the pivot 27 to an angular position corresponding to the drift angle of the aircraft along a first course of flight. Next, the arm 29 is set in accordance with the drift angle of the aircraft along a second course of flight at a 45° angle to the first course. The disc 19 is then turned to a position wherein the lines 21, 22 intersect the straight-edges 31 at an equal distance from the axis of rotation of the disc 19. In the example shown, the straight-edges 31 cross the lines 21, 22 at points between the arcuate lines 23 indicating a wind velocity of approximately 112 M. P. H. relative to an air speed of 200 M. P. H. The relation of the scale 25 on the disc to the indicia 26 on the supporting plate gives the wind direction relative to either course of travel, and in the position shown, indicates a head-wind approximately 8° from the first course and 37° from the second course. The ground speed relative to a 200 M. P. H. air speed on the alternate courses of travel is given by the corresponding readings on scales 31 at the intersection of the lines 21, 22. In the example shown, the indicated ground speed relative to a 200 M. P. H. air speed on the first course is approximately 90 M. P. H. in the direction shown, and relative to a 200 M. P. H. air speed on the second course, approximately 130 M. P. H. in the direction indicated.

Referring now to the wind indicator B, this includes a preferably circular supporting plate 50 to which is rotatably secured, as by a pivot 51, a transparent semi-circular disc 52. Disposed in parallel relation to the diametrical edge 53 of the disc 52 are spaced lines 54 representing the wind velocity relative to the ground. The margin of the disc 52 is provided with a scale 55 of angles from 0° to 90° beginning at the diametrical edge 53.

The supporting plate 50 is provided with lines 56, 57 extending radially from the pivot 51 and defining an angle, such as the 30° angle shown, which corresponds to the angle between alternate courses of flight of an aircraft. Secured to the supporting plate 50 along the lines 56, 57 for swinging movement about axes equidistant from the pivot 51, as by pivots 58, 59 are crossed arms 60, 61 provided with straight-edges 62, 63 extending radially of the pivots 58, 59 respectively. In the example shown, the distance between pivots 51 and 58, 59 is twice the distance from the pivot 51 to that wind velocity line 54 representing 200 M. P. H., or a distance equivalent to 400 M. P. H. on the wind velocity scale.

The semi-circular disc 52 is provided with a plurality of radial lines 64 representing aircraft speed relative to the ground. To determine the position of these lines 64, an arc 65 is drawn through the pivots 58, 59 with the axis of pivot 51 as a center; the wind velocity lines 54 are extended to intersect the arc 65, and a radial line 64 representing a speed of 100 M. P. H. is drawn toward the intersection of the 100 M. P. H. wind velocity line with the arc 65. In a similar manner, the radial line 64 representing a speed of 150 M. P. H. is drawn toward the arc 65 at its point of intersection with the 150 M. P. H. wind velocity line. The radial line 64 at 90° to the wind velocity lines 54 of course represents a speed of 400 M. P. H.

In order to facilitate setting the arms 60, 61, drift angle scales 66, 67 are provided on the upper surface of the supporting plate 50. These scales 66, 67 extend along arcs 68, 69 having the axes of pivots 58, 59 respectively, as centers, the intersections of the lines 56, 57 with the arcs 68, 69 respectively, being marked 0°. In the example shown, the arms 60, 61 are provided with scales 70, 71 for indicating wind velocity relative to each course of flight. For an aircraft speed of 400 M. P. H., the distance marked 400 on the scales 70, 71 is made equal to the distance between the pivots 51 and 59.

In the operation of the wind calculator B, the straight-edges 62, 63 of the arms 60, 61 are set on the scales 66, 67 to correspond with the drift angles noted during alternate courses of flight differing by an angle of 30°. By turning the disc 52 to a position wherein its diametrical edge 53, marked 0° on the wind direction scale 55, aligns with the intersection 72 of the straight-edges 62, 63, as shown in Figure 3, the wind direction relative to both courses may be read from the wind direction scale 55 at lines 56, 57. If the aircraft speed relative to the air is 300 M. P. H., the radial line 64 representing an air speed of 300 M. P. H. is aligned, by further rotation of the disc, with the intersection 72, as shown in Figure 4, whereupon the position of the intersection 72 relative to the spaced lines 54 furnishes an indication of the wind velocity relative to the ground. In the example shown in Figure 4, the indicated wind velocity is approximately 125 M. P. H. For an aircraft speed of 400 M. P. H., a ground velocity of approximately 325 M. P. H. relative to the first flight course is indicated by the scale 70 at the intersection 72, and a ground velocity of approximately 402 M. P. H. relative to the second flight course is indicated by the scale 71 at the intersection 72.

By setting the arm 60 so that its edge 62 crosses the pivot 51 and then turning the disc 52 until the line 64 marked 300 M. P. H. aligns with the edge 62, as depicted in Figure 5, the position of the point 72 on scale 70 with reference to the lines 54 indicates a ground speed correction of about 56 M. P. H. This correction is added or subtracted depending on whether the point 72 reads more or less than 400 on the scale 70. Since the point 72 is positioned at 325 on the scale 70, the correction of 56 M. P. H. is subtracted from the assumed air speed of 300 M. P. H., giving a ground speed of 244 M. P. H. for course 1. The correction for course 2 of about 2 M. P. H. is added to give a ground speed of 302 M. P. H.

It should be noted that the two triangles, formed by the elements arranged as shown in Fig. 3, having a common side along the line 51—72 and their opposite angles at 58 and 59 respectively, represent the vector diagrams of the respective speeds and directions for the two flights having a difference of 30° in their headings. The wind velocity and direction are represented vectorially by the common side, the radial lines 56 and 57 represent the two headings and common air speed and lines 58—72 and 59—72 represent the movement of the aircraft relative to the ground. The scales of velocity used on the several elements are based on an air speed of 400 M. P. H. In order to obtain readings to correspond to some other air speed, the lines 64 are provided to supply the necessary proportional scales, so that the lengths of the vectors may be proportionally evaluated in accordance with the air speed being used.

Various changes may be made in the forms of invention herein shown and described without departing from the spirit of the invention or the scope of the following claims.

This invention may be manufactured and/or used by or for the Government of the United States of America for governmental purposes without the payment of any royalty thereon or therefor.

I claim:

1. A wind calculator comprising a support, a disc rotatable relative to the support, said disc provided with spaced arcuate wind velocity indicia concentric with the axis of rotation of the disc and delineations defining the angle between alternate courses of flight, and arms pivoted to the support for swinging movement about an axis spaced from the axis of rotation of said disc, said arms provided with ground speed indicia spaced to correspond with the spacing of said wind velocity indicia.

2. A wind calculator comprising a support, a disc rotatable relative to the support, said disc provided with spaced arcuate wind velocity indicia concentric with the axis of rotation of the disc, delineations defining the angle between alternate courses of flight and a wind direction scale subdividing the angle defined by said delineations, said support provided with angularly spaced indicia cooperating with said wind direction scale, and arms pivoted to the support for swinging movement about an axis spaced from the axis of rotation of said disc, said arms provided with ground speed indicia corresponding with the spacing of said wind velocity indicia.

3. A wind calculator comprising a support, a disc rotatable relative to the support and provided with a radial index and with angularly spaced wind direction indicia forming a scale originating in said radial index, said support provided with delineations defining the angle between alternate courses of flight, and arms pivoted to the support for swinging movement about axes aligning with said delineations and spaced from the axis of rotation of said disc, said arms forming angles relative to said delineations corresponding to the angles of drift along said alternate courses, said arms intersecting at a point defining the wind vector and said scale indicating the wind direction relative to both courses upon alignment of said radial index with said point.

4. A wind calculator comprising a support, a disc rotatable relative to the support and provided with angularly spaced indicia related to airplane speed and spaced parallel indicia related to wind velocity, said support provided with delineations defining the angle between alternate courses of flight, and arms pivoted to the support for swinging movement about axes aligning with said delineations and at a distance from the axis of rotation of said disc, said arms forming angles relative to said delineations corresponding to the angles of drift along said alternate courses of flight, said arms intersecting at a point defining the wind vector, the relationship of said point to said parallel indicia indicating the wind velocity upon proper alignment of said angularly spaced speed indicia with said point.

5. A wind calculator comprising a support, a disc rotatable relative to the support and provided with a radial index and with angularly spaced wind direction indicia forming a scale originating in said radial index, said disc also being provided with aircraft speed indicia and spaced parallel indicia related to wind velocity, said support provided with delineations defining the angle between alternate courses of flight, and arms pivoted to the support for swinging movement about axes aligning with said delineations and at a given distance from the axis of rotation of said disc, said arms forming angles relative to said delineations corresponding to the angles of drift along said alternate courses of flight, said arms intersecting at a point defining the wind vector, said scale indicating the wind direction relative to both courses upon alignment of said radial index with said point, the relationship of said point to said parallel indicia indicating the wind velocity upon proper alignment of said angularly spaced speed indicia with said point.

6. An air navigation instrument composed of a base having a circular disc pivoted at its center thereto, a pair of arms having a common pivot on the base to one side of the circular disc, one edge of each arm being alined with the center of the common pivot and having a linear scale thereon originating at the center of the pivot, a pair of radial lines on the circular disc subtending a predetermined arc at the periphery thereof which is subdivided into a degree scale, a series of arcs between the radial lines having radii varying by a constant interval to form a radial scale of distances from the center of the disc pivot, angular reference marks on the base at the periphery of the disc having an origin on the line between the center of the two pivots, the divisions and designations on the linear scales being of the same value as the radial scale.

7. An air navigation instrument comprising a base, a semi-circular disc pivotally mounted thereon for rotation about its radial center, a pair of arms pivotally mounted on the base at points equidistant from the center of the disc pivot just beyond the circle swept by the disc and angularly spaced at a predetermined angle, each arm having one edge in line with the center of its pivot and a linear scale of distances marked off on this edge from the center of its pivot, a similar scale being marked off by parallel chord lines on the disc from the diametral edge thereof, a line marked on the base between the center of the disc pivot and each of the arm pivot centers, an angular scale on the base about each of the arm pivots having its origin radially in line with the center of the disc pivot, an angular scale on the disc having radial lines each designated by the distance represented by the parallel chord line whose extension crosses the intersection of the radial line with an arc struck from the center of the disc pivot through the centers of the arm pivots, and an angular scale on the arcuate edge of the disc originating at the diametral line.

HARRY B. MARIS.